Aug. 1, 1961         N. CORDIS         2,994,299
CONTINUOUS STOCK FEEDER AND JUMBO HOPPER
Filed July 23, 1958                3 Sheets-Sheet 1
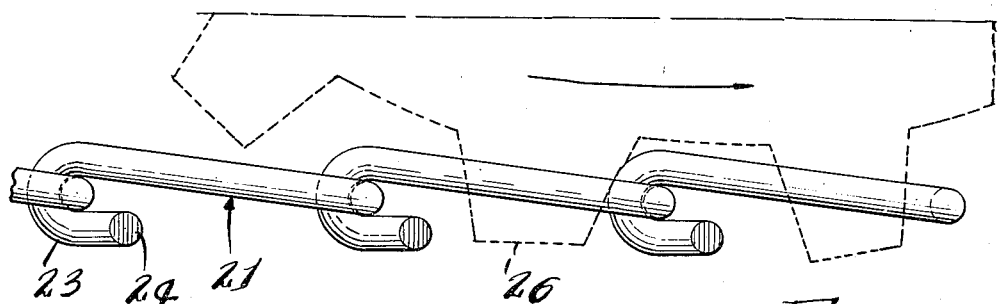
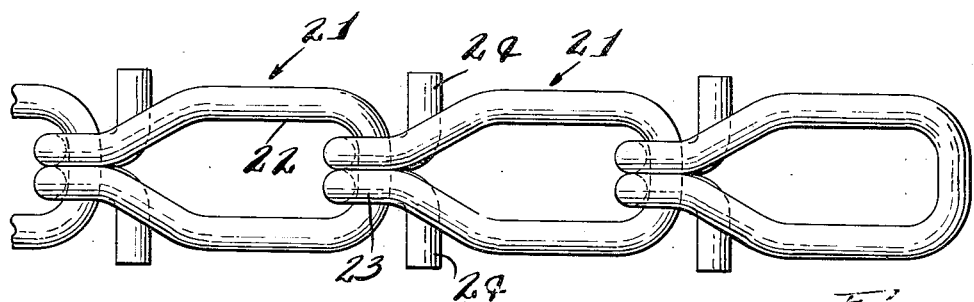
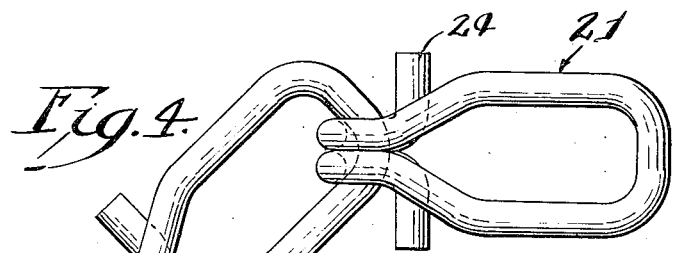
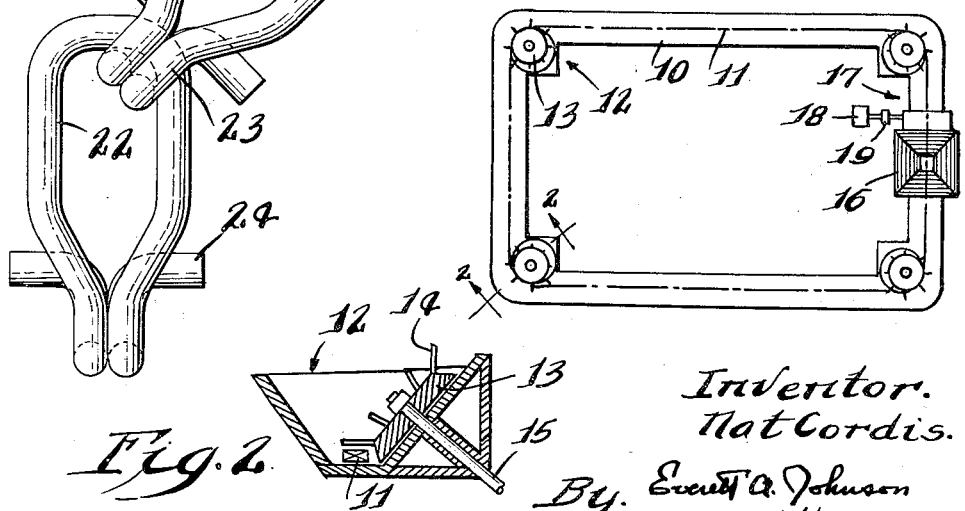
Inventor.
Nat Cordis.
By Everett A. Johnson
Attorney.

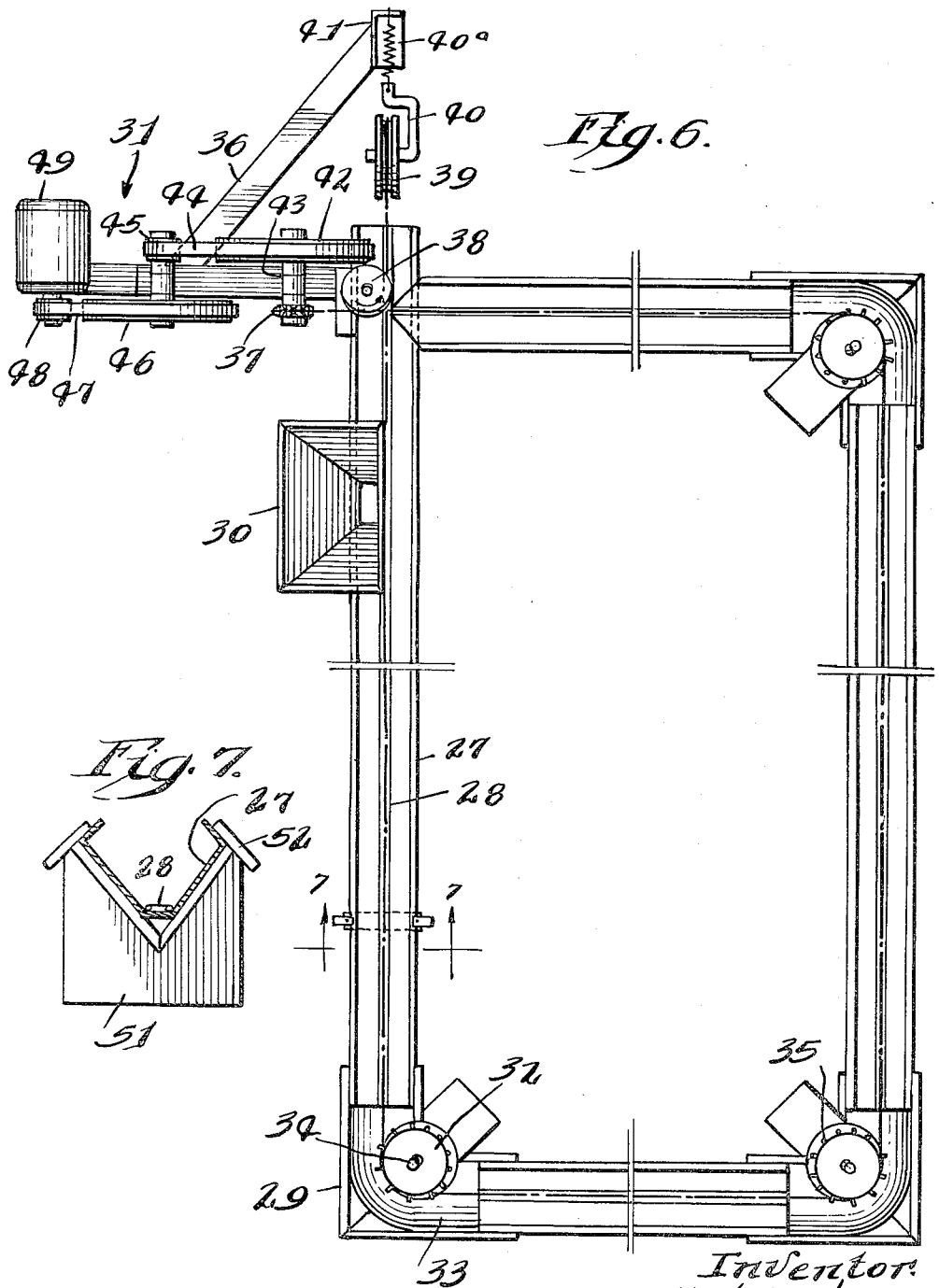

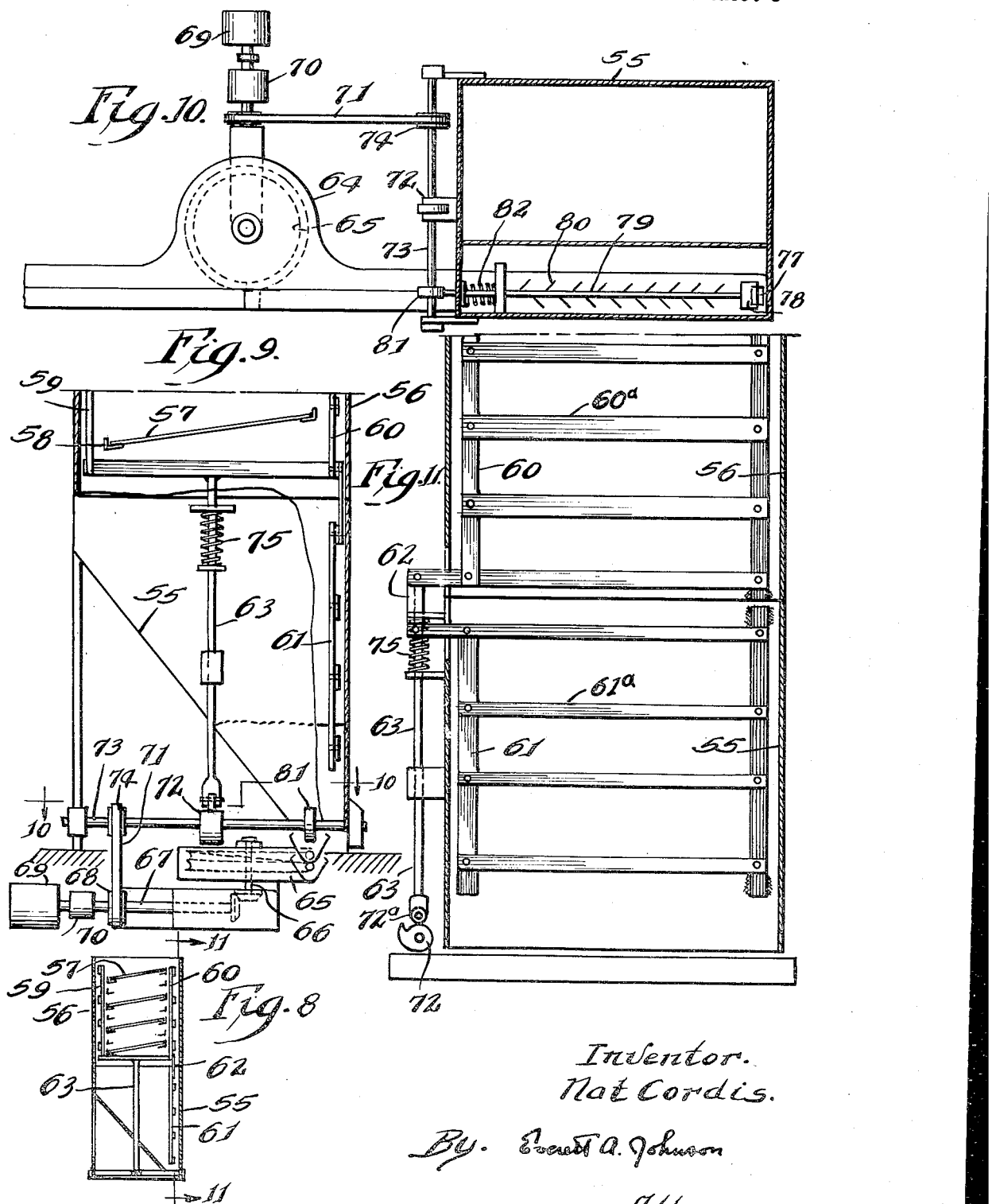

United States Patent Office 2,994,299
Patented Aug. 1, 1961

2,994,299
CONTINUOUS STOCK FEEDER AND
JUMBO HOPPER
Nat Cordis, Crown Stock Farms, Silver Lake, Wis.
Filed July 23, 1958, Ser. No. 750,456
4 Claims. (Cl. 119—52)

This invention relates to conveyors for flowable solid materials and, more particularly, to a feeding system for distributing pulverant materials from a bulk hopper along an open-topped trough which is accessible to stock including poultry. More specifically, the invention is an improvement in a system for automatically distributing feed from a jumbo hopper in a closed circuit trough-type poultry feeder.

The feeding of livestock such as poultry on a large scale necessarily involves the handling of large quantities of feed and heretofore considerable manual attention has been required to provide an adequate bulk supply for automatic feeders. Accordingly, a primary object of this invention is to provide a feeder of large capacity in which the feeding can be controlled with a minimum of attention by an operator. Another object is to provide a method and automatic means for uniformly distributing fresh feed from a large-capacity hopper within a continuous or closed circuit flock feeder. An additional object is to provide an automatic and controllable feeder which is of rugged and inexpensive construction. An important object of the invention is to provide an apparatus which maintains a continuously renewed supply of feed in a continuous trough while minimizing the possibility of accumulating stale feed along the path of the conveyor. A further object is to provide an apparatus which is readily expandable for various sizes of flocks of poultry, but which is also efficient for use in connection with relatively small flocks. A more specific object of the invention is to provide a flexible conveyor element which is of simple sturdy construction, is readily demountable, and is uniform in its feed carrying capacity.

An additional object of the invention is to provide a hopper construction which is of adjustable capacity. It is also an object of the invention to provide such a hopper which is adapted to discharge feed progressively, and with a minimum of attention, from a large bulk supply. These and other objects of the invention will become apparent to those skilled in the art as the description thereof proceeds.

Briefly, this invention provides improved poultry or stock feeders of the type wherein a feed conduit, comprising an open-topped horizontal trough, is arranged in communication with a feed supply hopper of unique design and wherein an endless flexible distributing means, comprising a demountable distributing chain, is moved longitudinally of the trough within a closed circuit.

The word "flights" as used hereinafter has reference to the straight lengths of trough and to the lengths of the demountable distributing chain which runs within the same portion of the trough. At intersecting flights, corners are provided for directing the strands at about 90° angles. At the corners it is desired to change the direction of travel of the endless flexible demountable distributing chain in the presence of a minimum feed. Accordingly, the feed supply hopper may be placed at any convenient point along the trough, but ordinarily will be placed over a flight just beyond a corner.

I have devised a positive drive means which is placed at one of the corners, and in traversing the drive corner two flights of distributing chain are superposed in a crossover whereby the feed being distributed is caused to discharge upon the chain emerging from the drive, such emerging chain being substantially free of feed.

The distributing chain preferred for use in my improved feeder is a demountable wire-formed link chain. The chain link includes laterally extending portions which enhance the feed carrying capacity of the distributor without the use of individual paddles and the like.

A take-up can be provided for the conveyor chain by making one or more of the pulleys in the drive corner adjustable with respect to another pulley therein. Alternatively, a weighted conveyor take-up or a telescoping portion of two trough sections may be adjustably linked to provide the necessary take-up.

Details of my invention will be described by reference to particular embodiments thereof illustrated in the drawings wherein:

FIGURE 1 is a schematic plan view showing the general arrangement of closed circuit feeder embodying the principles of my invention;

FIGURE 2 is a section through the trough taken at line 2—2 in FIGURE 1;

FIGURE 3 is a plan view of a chain formed according to the invention;

FIGURE 4 is a view similar to FIGURE 3, but illustrating how the chain can flex in the plane of the links;

FIGURE 5 is a side elevational view of the chain in FIGURE 3 in drive position;

FIGURE 6 is a plan view of a preferred embodiment of the invention and showing details of the drive;

FIGURE 7 is a section taken along the line 7—7 in FIGURE 6;

FIGURE 8 is an elevation, partly in section, of a hopper construction;

FIGURE 9 is an enlarged fragmentary view showing details of another drive system;

FIGURE 10 is a view taken along the line 10—10 in FIGURE 9; and

FIGURE 11 is an enlarged view taken along the line 11—11 in FIGURE 8.

Referring to FIGURE 1, a stock feeder is shown having an open-topped trough 10, an endless flexible distributing or conveying strand 11 running on the bottom of the trough 10, a supply hopper 16 from which feed discharges onto the strand 11, drive means 17, and idler corners 12 for guiding the strand 11 around the circuit, and for holding the strand 11 within the trough 10.

The idler corners 12 include idler corner pulley 13, guide pins 14 on the pulley 13, and the inclined pulley shaft 15 on which the pulley 13 is mounted, as shown in FIGURE 2.

The drive unit 17 is driven by motor 18 through transmission 19. The hopper 16 may be of the construction shown in FIGURE 8 for example, and the drive unit 17 may be similar to that shown in FIGURES 9 and 10.

Referring to FIGURES 3, 4 and 5, the improved links 21, each of which is formed of a single length of wire, each comprises a loop body 22, a shank 23 and oppositely disposed bars or wings 24. By rotating an end link 21 about a shank 23 and sliding the rotated link 21 along the loop body 22 of an adjacent link 21, the bars 24 can be disposed centrally of the loop body 22 permitting the separation of the rotated link from the remaining links.

The demountable chain formed on the links 21 may be driven through a trough by a sprocket 26, as shown in FIGURE 5. It will be understood, however, that other types of drives may be used and will be illustrated by reference to other figures herein.

With reference to FIGURES 6 and 7, this embodiment of the invention comprises a trough 27 within which a conveyor 28 travels counter-clockwise, picking up feed from the hopper 30 and then in series through the idler corners 29 and the connecting flights of trough 27 by means of the drive unit 31. Three of the flights of the trough 27 are in substantially the same plane with the fourth or cross-over flight terminating at an elevated point in the drive corner 31a. Thus, the entering flight of trough 27 and the strand and/or conveyor superpose the emerging strand 28 and any feed still carried by the entering strand 28 after making the circuit is dropped from the end of the entering trough section 27a and deposited upon the emerging flight 28 in the lower section 27b of the trough 27 to be recirculated. If desired, an intercepting screen or separator may be interposed the entering and emerging strands to separate litter from the recirculated feed.

The drive mechanism or unit 31 comprises a drive unit frame 36 on which is mounted drive sprocket 37. The drive sprocket 37 is driven by drive pulley shaft 43, drive pulley 42, drive belt 44, transmission pulley 45, and transmission drive 46. The motor 49, the motor pulley 48 and the motor drive belt 47 apply power to the transmission drive 46.

As the drive sprocket 37 is rotated, the conveyor 28 is drawn over the sprocket 37, around the drive corner pulley 38, over and under the take-up pulley 39, and into the trough 27. The take-up pulley 39 is resiliently mounted by means of take-up pulley bracket 40 and take-up spring 40a, which is secured to the anchor 41, mounted on drive unit frame 36.

Referring to the idler corners 29, each comprises an idler pulley 32, a curved baffle plate 33, and an inclined pulley shaft 34. The pulley 32 is provided with conveyor guide pins 35, and the entire assembly 29 is generally similar to that shown in FIGURE 2.

In FIGURE 7, I have illustrated one means for supporting the trough 27, this includes a support block 51 and pairs of opposed trough clamping bars 52. Such support means may be provided at spaced points along the closed circuit of trough 27, as may be necessary to provide the required support and elevation.

In FIGURES 8 to 11, I have illustrated an embodiment of a storage hopper 16 which has been adapted for use as a bulk bin. This includes the main body of the hopper 55 and an extension hopper 56. The extension 56 includes a plurality of inclined shelves 57 supported by shelf brackets 58. The upper and lower edges of the shelves 57 are spaced from the side walls of the extension 56 with agitators 59 and 60 being arranged for vertical oscillation adjacent the side walls. A third agitator 61 is connected by linkage 62 to agitator 60.

Each of agitators 59, 60 and 61 comprises a plurality of pivoted cross members 59a, 60a and 61a. Drive bar 63 is raised and lowered by cam 72 and cam follower 72a, the cam shaft 73 being rotated by pulley 74 on cam shaft 73. The pulley 74 is driven by drive belt 71 by means of drive take-off pulley 68. A motor 69 and a transmission 70 drives the drive shaft 67 on which the drive take-off pulley 68 is mounted.

Associated with the hopper actuating drive is a sheave 65 which is driven through shaft 66, which is geared to drive shaft 67. The conveyor 28 is looped about the sheave 65 and leaves one section of the trough 27 and enters an adjacent section thereof as shown in FIGURE 9.

Rotation of the cam shaft 73 causes the cam 72 to rotate and lift the drive bar 63 against the cam return spring 75. The linkage 62 is thereby raised causing the agitators 59, 60 and 61 to be raised and lowered adjacent the walls of the hopper 55 and extension hopper 56. This dislodges feed which might otherwise bridge between the edges of the shelves 57 and the walls.

At the lower end of the hopper 55, I provide a hopper discharge port 77 having a port cover 78. A delivery bar drive cam 81 on the cam shaft 73 reciprocates the delivery bar 79 having blades 80 and supporting the port cover 78.

Delivery bar return spring 82 causes the bar 79 to follow the cam 81. Thus, operation of the agitators 59, 60 and 61 is correlated with the alternate opening and closing of the discharge port 77, the blades 80 on delivery bar 79 urging feed from below the agitators in the direction of the port 77.

The foregoing description has been with respect to a closed circuit system wherein three idler corners are associated with a single drive corner. It is contemplated, however, that the principles of design incorporated herein may be utilized in a closed trough circuit which includes only a drive end and a turnaround end with conveyor flights running in parallel therebetween in the same trough.

Although my apparatus has been described in terms of particular embodiments thereof which have been set forth in considerable detail, it should be understood that this is by way of illustration only and that my invention is not limited thereto. Alternative constructions and operating techniques will become apparent to those skilled in the art in view of my disclosure and, accordingly, it is contemplated that modifications can be made without departing from the spirit of the described invention.

What I claim is:

1. In a poultry feeder of the type including a hopper having agitating means therein, an open-topped trough and an endless flexible conveyor operating therein to convey feed from such hopper, the improvement which comprises a bulk bin hopper of large capacity, a plurality of vertically spaced and inclined shelves within an upper portion of said hopper, said shelves extending from one pair of opposed walls and being spaced from the other pair of spaced walls, agitator means vertically oscillatable along the walls of said hopper, said hopper being provided with discharge port means below said agitators, said discharge port means including an oscillating delivery bar having feed agitating blades thereon.

2. The apparatus of claim 1 which includes operating bar means for vertically oscillating said agitator means in unison and means for simultaneously oscillating said delivery bar.

3. The apparatus of claim 2 wherein the means for actuating said operating bar means includes means for driving said conveyor below said discharge port.

4. In a stock feeder comprising an open-topped trough means into which feed is discharged from a hopper of large capacity, an endless continuous demountable chain conveyor carried through said trough means adjacent the bottom thereof, the improvement which comprises a hopper of large capacity astride said trough means, said hopper having an extension thereon to increase its capacity, said extension including a plurality of inclined shelves over which feed may cascade downwardly into the hopper, means for avoiding bridging of the cascading feed, said last-named means comprising vertically oscillatable pivoted lattice members disposed between the edges of the shelves and the adjacent hopper extension walls, and means for oscillating said lattice members and for driving said conveyor.

References Cited in the file of this patent

UNITED STATES PATENTS

| | | |
|---|---|---|
| 2,547,581 | Kearns | Apr. 3, 1951 |
| 2,554,589 | Patz et al. | May 29, 1951 |
| 2,583,203 | Bergeron | Jan. 22, 1952 |
| 2,613,641 | Cordis | Oct. 14, 1952 |
| 2,705,474 | Siciliano | Apr. 5, 1955 |
| 2,798,645 | Keen et al. | July 9, 1957 |